US008033604B2

(12) United States Patent
Behrens et al.

(10) Patent No.: US 8,033,604 B2
(45) Date of Patent: Oct. 11, 2011

(54) VEHICLE SEAT SYSTEM AND MOTOR VEHICLE HAVING A VEHICLE SEAT SYSTEM

(75) Inventors: Meinhard Behrens, Obernkirchen (DE); Klaus-Dieter Habedank, Stadthagen (DE); Thorsten Ackmann, Auetal (DE)

(73) Assignee: Faurecia Autositze GmbH, Stadthagen (DE)

( * ) Notice: Subject to any disclaimer, the term of this patent is extended or adjusted under 35 U.S.C. 154(b) by 83 days.

(21) Appl. No.: 12/024,574

(22) Filed: Feb. 1, 2008

(65) Prior Publication Data
US 2009/0008975 A1 Jan. 8, 2009

(30) Foreign Application Priority Data

Feb. 1, 2007 (DE) .................. 10 2007 005 144

(51) Int. Cl.
*A47C 15/00* (2006.01)
*A47C 7/62* (2006.01)
(52) U.S. Cl. ..................... 297/236; 297/188.1
(58) Field of Classification Search .............. 297/236, 297/257, 235, 234, 233, 248, 232, 245, 188.1, 297/144, 240, 353, 378.1; 296/65.01, 65.05, 296/65.09, 65.16
See application file for complete search history.

(56) References Cited

U.S. PATENT DOCUMENTS

| 449,419 A * | 3/1891 | Hutton et al. ............. 297/354.13 |
| 735,070 A * | 8/1903 | Davidson ..................... 297/236 |
| 808,679 A | 1/1906 | Pickles |
| 826,575 A * | 7/1906 | Hunter .............................. 108/8 |
| 1,320,854 A * | 11/1919 | Hammers ...................... 297/236 |
| 1,643,236 A * | 9/1927 | Bell ............................. 297/236 |
| 2,116,366 A * | 5/1938 | Scott ............................. 297/43 |
| 4,527,829 A * | 7/1985 | Fanslau et al. .................. 297/17 |
| 4,971,395 A | 11/1990 | Coussemacq et al. |
| 6,773,059 B2 * | 8/2004 | Volotsenko ................... 297/129 |
| 6,811,200 B2 * | 11/2004 | Shibata et al. .................. 296/64 |
| 6,840,577 B2 * | 1/2005 | Watkins ..................... 297/284.9 |
| 6,929,321 B1 * | 8/2005 | Shrock .......................... 297/118 |
| 7,014,241 B2 * | 3/2006 | Toyota et al. .............. 296/37.15 |
| 7,077,474 B2 * | 7/2006 | Satani ........................... 297/236 |
| 7,234,777 B2 * | 6/2007 | Schweikarth et al. ........ 297/353 |
| 7,490,896 B2 * | 2/2009 | Smith .......................... 297/235 |
| 2003/0127891 A1 * | 7/2003 | Wiedeman et al. ........... 297/232 |

(Continued)

FOREIGN PATENT DOCUMENTS

DE        2706097        7/1978

(Continued)

*Primary Examiner* — Milton Nelson, Jr.
(74) *Attorney, Agent, or Firm* — Kenyon & Kenyon LLP

(57) ABSTRACT

A motor vehicle includes a vehicle seat system, the vehicle seat system including a vehicle seat having a seat back and a seat part. The seat part and the seat back are mechanically connected to each other by a hinge having a first axis of rotation extending substantially in the transverse direction of the motor vehicle. The vehicle seat system includes a folding vehicle seat capable of being folded up and situated next to the vehicle seat having a folding vehicle seat seat part and having a folding vehicle seat seat back. The folding vehicle seat seat part and the folding vehicle seat seat back are mechanically connected to each other by a hinge having a second axis of rotation extending substantially in the transverse direction of the motor vehicle, which with respect to the first axis of rotation is offset or displaceable in the longitudinal direction of the motor vehicle. The folding vehicle seat in the folded state is able to be situated, e.g., substantially entirely, below the seat part and/or the vehicle seat and the folding vehicle seat are mechanically connected to each other.

24 Claims, 19 Drawing Sheets

U.S. PATENT DOCUMENTS

| | | | |
|---|---|---|---|
| 2003/0214166 A1* | 11/2003 | Schambre et al. | 297/353 |
| 2004/0094999 A1* | 5/2004 | Volotsenko | 297/188.1 |
| 2005/0104424 A1* | 5/2005 | Park | 297/232 |
| 2005/0127725 A1* | 6/2005 | Satani et al. | 297/188.08 |
| 2005/0218683 A1 | 10/2005 | Toyota et al. | |

FOREIGN PATENT DOCUMENTS

| | | |
|---|---|---|
| DE | 3604187 | 10/1986 |
| DE | 3704489 | 8/1988 |
| DE | 68903290 | 3/1993 |
| DE | 43 37 938 | 5/1995 |
| DE | 10144078 | 4/2003 |
| DE | 102004011137 | 9/2005 |
| DE | 20 2005 019 374 | 3/2006 |
| EP | 0336819 | 11/1989 |
| EP | 1 449 710 | 8/2004 |
| EP | 1449720 | 8/2004 |
| EP | 1 632 389 | 3/2006 |
| GB | 2201087 | 8/1988 |
| JP | 09-002113 | 1/1997 |
| JP | 2002-225603 | 8/2002 |

* cited by examiner

VEHICLE SEAT SYSTEM AND MOTOR VEHICLE HAVING A VEHICLE SEAT SYSTEM

CROSS-REFERENCE TO RELATED APPLICATIONS

The present application claims priority to Application No. 10 2007 005 144.3, filed in the Federal Republic of Germany on Feb. 1, 2007, which is expressly incorporated herein in its entirety by reference thereto.

FIELD OF THE INVENTION

The present invention relates to a vehicle seat system, e.g., for a motor vehicle, and a motor vehicle having a vehicle seat system.

BACKGROUND INFORMATION

European Published Patent Application No. 1 449 720 describes a seat part situated next to the vehicle seat, which is capable of being folded into the storage space, and a seat back associated with the seat part but separate from it, which is capable of being folded away laterally.

U.S. Pat. No. 808,679 describes a folding vehicle seat capable of being folded up, which in the folded state may be slid from the side under an adjacent seat.

German Published Patent Application No. 689 03 290 describes a back seat for a motor vehicle capable of being folded over, which has a seat surface and two seat backs situated side by side, which are each equipped with device(s) for locking in the raised application position, both seat backs being supported by a common horizontal shaft, the latter being able to be swiveled about an axis between a raised application position of the seat bench and a folded-down position of the two seat backs and one of the seat backs being mounted on it in a swiveling manner.

German Published Patent Application No. 10 2004 011 137 describes a motor vehicle back seat system having at least one first seat component swiveling about an axis, which is lockable at least indirectly with the vehicle structure, and a swiveling second seat component situated offset in the axial direction of the axis, which is lockable with the first seat component, at least one double fitting being provided for swiveling and locking the first seat component and the second seat component.

SUMMARY

Example embodiments of the present invention provide an improved vehicle seat system, and example embodiments of the present invention provide an improved passage to a rear, e.g., a third, row of seats.

According to an example embodiments of the present invention, a motor vehicle includes a vehicle seat system, the vehicle seat system including a vehicle seat having a seat back and a seat part, the seat part and the seat back being mechanically connected to each other by a hinge having a first axis of rotation extending substantially in the transverse direction of the motor vehicle, the vehicle seat system having a folding vehicle seat capable of being folded up and situated next to the vehicle seat having a folding vehicle seat seat part and a folding vehicle seat seat back, the folding vehicle seat seat part and a folding vehicle seat seat back being mechanically connected to each other by a hinge having a second axis of rotation extending substantially in the transverse direction of the motor vehicle, which is offset or displaceable with respect to the first axis of rotation in the longitudinal direction of the motor vehicle, and the folding vehicle seat in the folded state being able to be situated, e.g., substantially entirely, below the seat part and/or the folding vehicle seat and the vehicle seat being (e.g., directly) mechanically connected to each other.

With respect to the first axis of rotation, the second axis of rotation may be offset or displaceable by at least 50 mm in the longitudinal direction of the motor vehicle.

The vehicle seat and the folding vehicle seat may be mechanically connected to each other by a hinge.

The folding vehicle seat seat back may be height-adjustable. For this purpose, the folding vehicle seat seat back may be capable of being folded up. The folding vehicle seat seat back may have an at least bipartite construction, at least two parts of the folding vehicle seat seat back being mechanically connected to each other by a hinge. A folding vehicle seat seat back is not already height-adjustable because it has a height-adjustable head rest. A folding vehicle seat seat back may be, e.g., height-adjustable if an area of the seat back provided for supporting the back or the shoulder of a user is height-adjustable.

The folding vehicle seat seat back may be lockable on the seat back.

A storage space accessible by folding away and/or displacing the seat part may be provided, there, e.g., being a provision for the folding vehicle seat in the folded state, when the seat part is folded away and/or displaced, to be, substantially in its entirety, capable of being lowered from above into the storage space and/or folded from above into the storage space.

According to an example embodiment of the present invention, a vehicle seat system, e.g., for a motor vehicle having a vehicle seat including a seat back and a seat part, the vehicle seat system including a folding vehicle seat capable of being folded up and situated next to the vehicle seat having a folding vehicle seat seat part, the folding vehicle seat in the folded state being able to be situated, e.g., substantially entirely, below the seat part, and the folding vehicle seat including a height-adjustable folding vehicle seat seat back.

For this purpose, a provision may be made for the height of the folding vehicle seat seat back to be reduced such that it is less than the depth of the seat part. The folding vehicle seat seat back may be capable of being folded up. The folding vehicle seat seat back may have an at least bipartite construction, at least two parts of the folding vehicle seat seat back being mechanically connected to each other by a hinge. Suitable refinements for the height adjustment of the folding vehicle seat seat back may be gathered from the subsequently described exemplary embodiments or from German Published Patent Application No. 36 04 187, German Published Patent Application No. 101 44 078, German Published Patent Application No. 27 06 097 and/or German Published Patent Application No. 37 04 489, each of which is expressly incorporated herein in its entirety by reference thereto. A folding vehicle seat seat back may not already be height-adjustable because it has a height-adjustable head rest. A folding vehicle seat seat back may be, e.g., height-adjustable if an area of the seat back provided for supporting the back or the shoulder of a user is height-adjustable.

In a folding vehicle seat capable of being folded up, e.g., the folding vehicle seat seat back is able to be folded onto the folding vehicle seat seat part, there being, e.g., a provision for the folding vehicle seat seat back and the folding vehicle seat seat part to be mechanically permanently connected to each other, e.g., by a hinge. A folding vehicle seat may be, e.g., not wider than 400 mm. A folding vehicle seat may be, e.g., narrower than the vehicle seat.

The vehicle seat and the folding vehicle seat may be mechanically connected to each other by a hinge.

A storage space accessible by folding away and/or displacing the seat part may be provided, there being, e.g., a provision for the folding vehicle seat in the folded state, when the seat part is folded away and/or displaced, to be, substantially entirely, capable of being lowered from above into the storage space and/or folded from above into the storage space.

The folding vehicle seat seat back may be lockable on the seat back.

A motor vehicle having a vehicle seat system, e.g., including one or more of the aforementioned features may be provided.

The vehicle seat and the folding vehicle seat may be mechanically connected to each other by a hinge having an axis of rotation extending substantially in the longitudinal direction of the motor vehicle.

The folding vehicle seat seat back may have an at least bipartite construction, at least two parts of the folding vehicle seat seat back being mechanically connected to each other by a hinge having an axis of rotation extending substantially in the transverse direction of the motor vehicle.

The seat part and the seat back may be mechanically connected to each other by a hinge having a seat back axis of rotation extending substantially in the transverse direction of the motor vehicle, there being, e.g., a provision for the folding vehicle seat seat part and the folding vehicle seat back to be mechanically connected to each other by a hinge having an axis of rotation extending substantially in the transverse direction of the motor vehicle, which with respect to the seat back axis of rotation is offset or displaceable in the longitudinal direction of the motor vehicle. With respect to the axis of rotation of the seat back, the axis of rotation may be offset or displaceable by at least 50 mm in the longitudinal direction of the motor vehicle.

At least one rear bench or another vehicle seat may be situated behind the vehicle seat system, the folding vehicle seat clearing an access to the rear bench or to the additional vehicle seat when it is situated in the storage space. A vehicle seat for a driver and/or a vehicle seat for a front passenger may be situated in front of the vehicle seat system. The folding vehicle seat may be situated on a drive tunnel.

A hinge may also be a hinge-like element or an element acting like a hinge.

A motor vehicle may be, e.g., a land vehicle that may be used individually in road traffic. However, motor vehicles are not limited to land vehicles having an internal combustion engine.

Further features and aspects of example embodiments of the present invention are described in more detail below with reference to the appended Figures.

DETAILED DESCRIPTION

Figure 1:
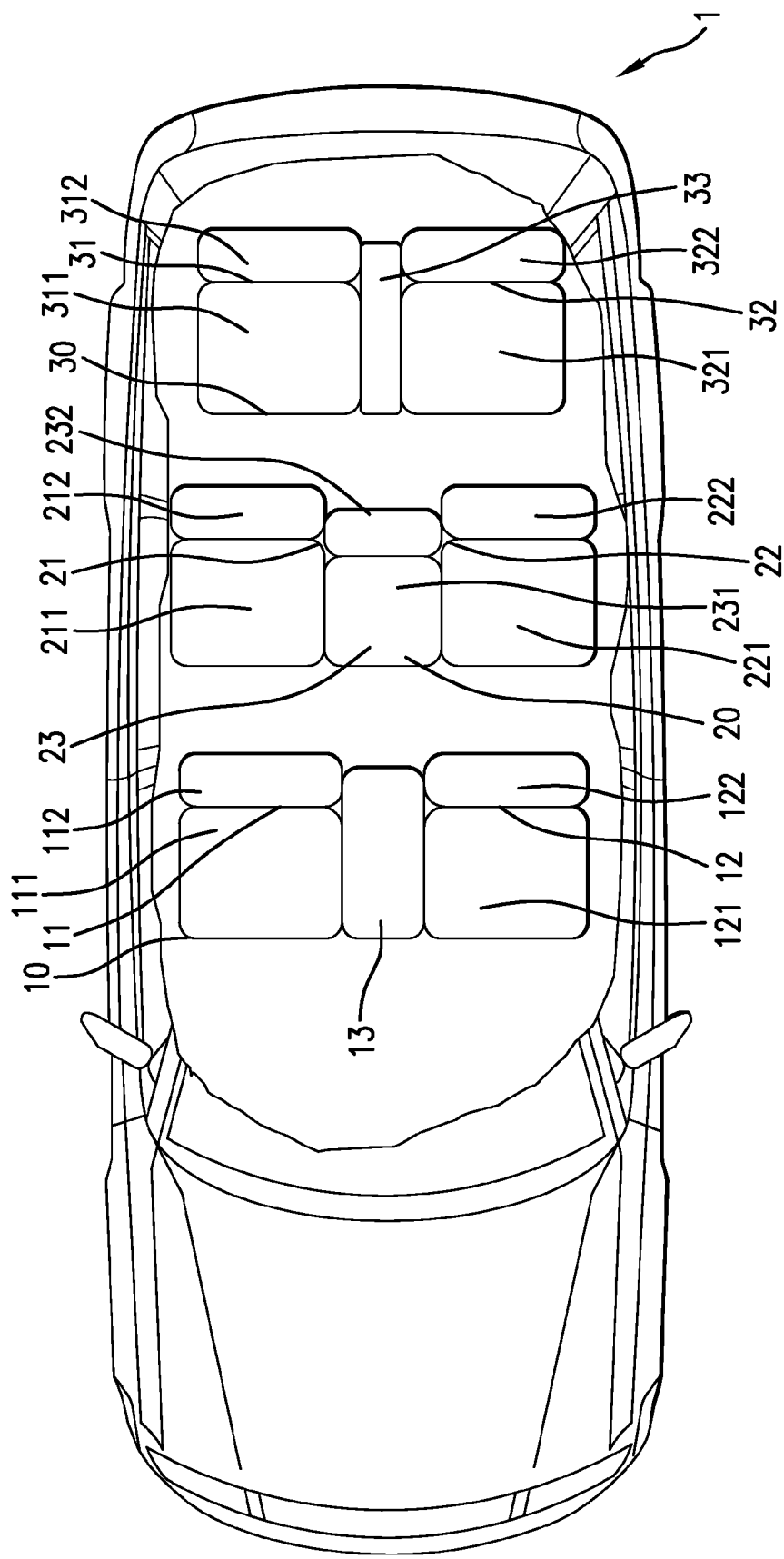
FIG. 1 is a schematic top view of a motor vehicle.

FIG. 1 is a schematic top view of a motor vehicle 1. Motor vehicle 1 includes a front vehicle seat system 10 having a vehicle seat 11, a console 13 and a vehicle seat 12, a middle vehicle seat system 20 and a rear vehicle seat system 30 having a vehicle seat 31, a console 33 and a vehicle seat 32. Vehicle seat system 20 includes a vehicle seat 21, a vehicle seat 22, and a folding vehicle seat 23 situated between vehicle seat 21 and vehicle seat 22, which is situated on a drive tunnel. Reference numerals 111, 121, 211, 221, 311 and 321 denote seat parts of vehicle seats 11, 12, 21, 22, 31 and 32, and reference numerals 112, 122, 212, 222, 312 and 322 denote seat backs of vehicle seats 11, 12, 21, 22, 31 and 32.

Figure 2:
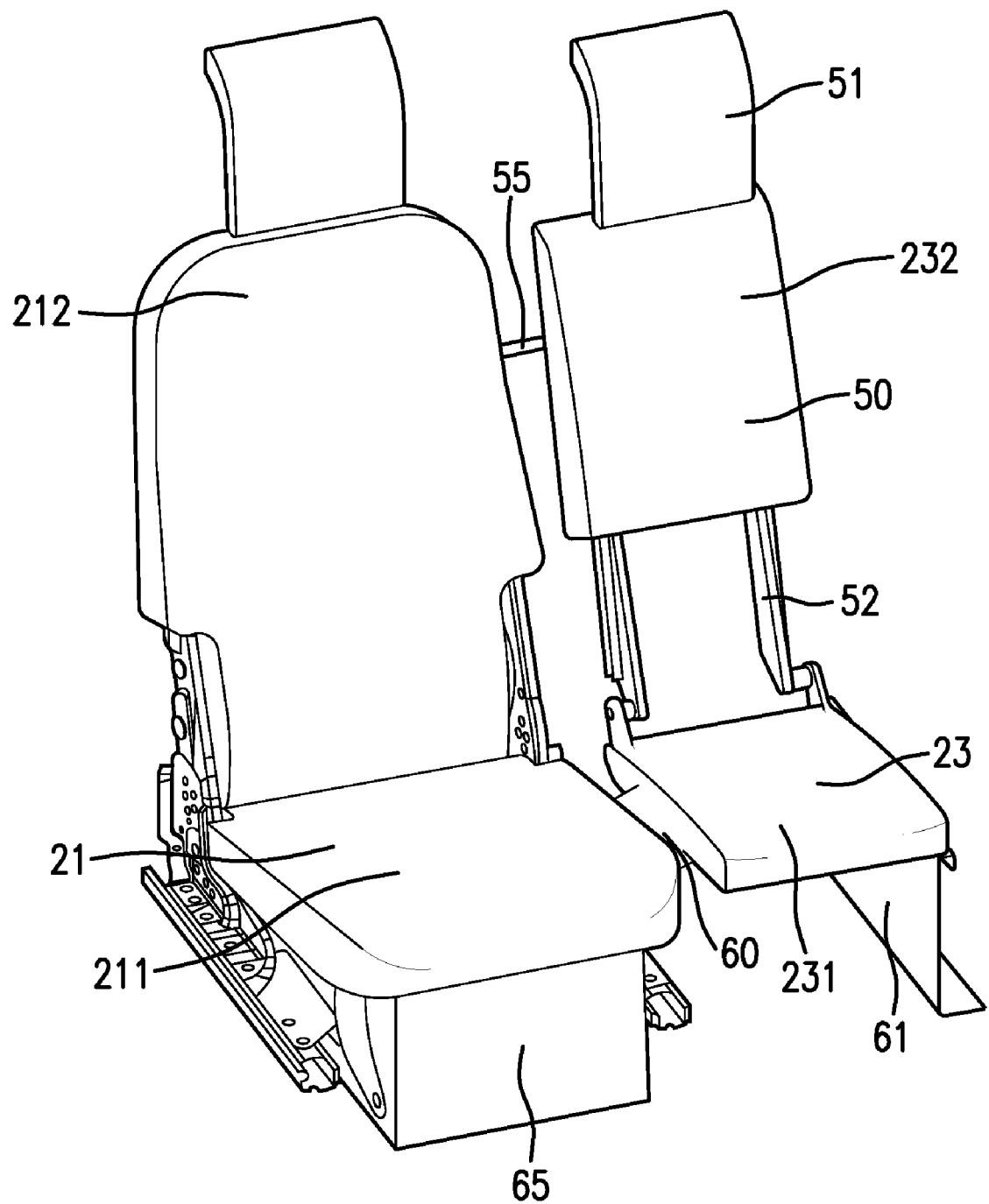
FIG. 2 is a perspective view of a vehicle seat system having a folding vehicle seat in an unfolded state.

Folding vehicle seat 23 shown in more detail in FIG. 2 includes a folding vehicle seat seat part 231 and a folding vehicle seat back 232. Folding vehicle seat back 232 includes an upholstered part 50 displaceable along a rail 52 and a height-adjustable head rest 51. Another upholstered part (having a back panel) may be provided in the space between upholstered part 50 and folding vehicle seat seat part 231. Folding vehicle seat seat part 231 is mechanically connected to vehicle seat 21 by a hinge 60 having an axis of rotation extending substantially in the longitudinal direction of motor vehicle 1. On a side across from hinge 60, folding vehicle seat 23 has a support section 61 assigned to it for supporting folding vehicle seat seat part 231. A storage space 65 is provided under folding vehicle seat seat part 231. Folding vehicle seat back 232 is fastened in detachable fashion on seat back 212 by a lock 55.

Figure 3:
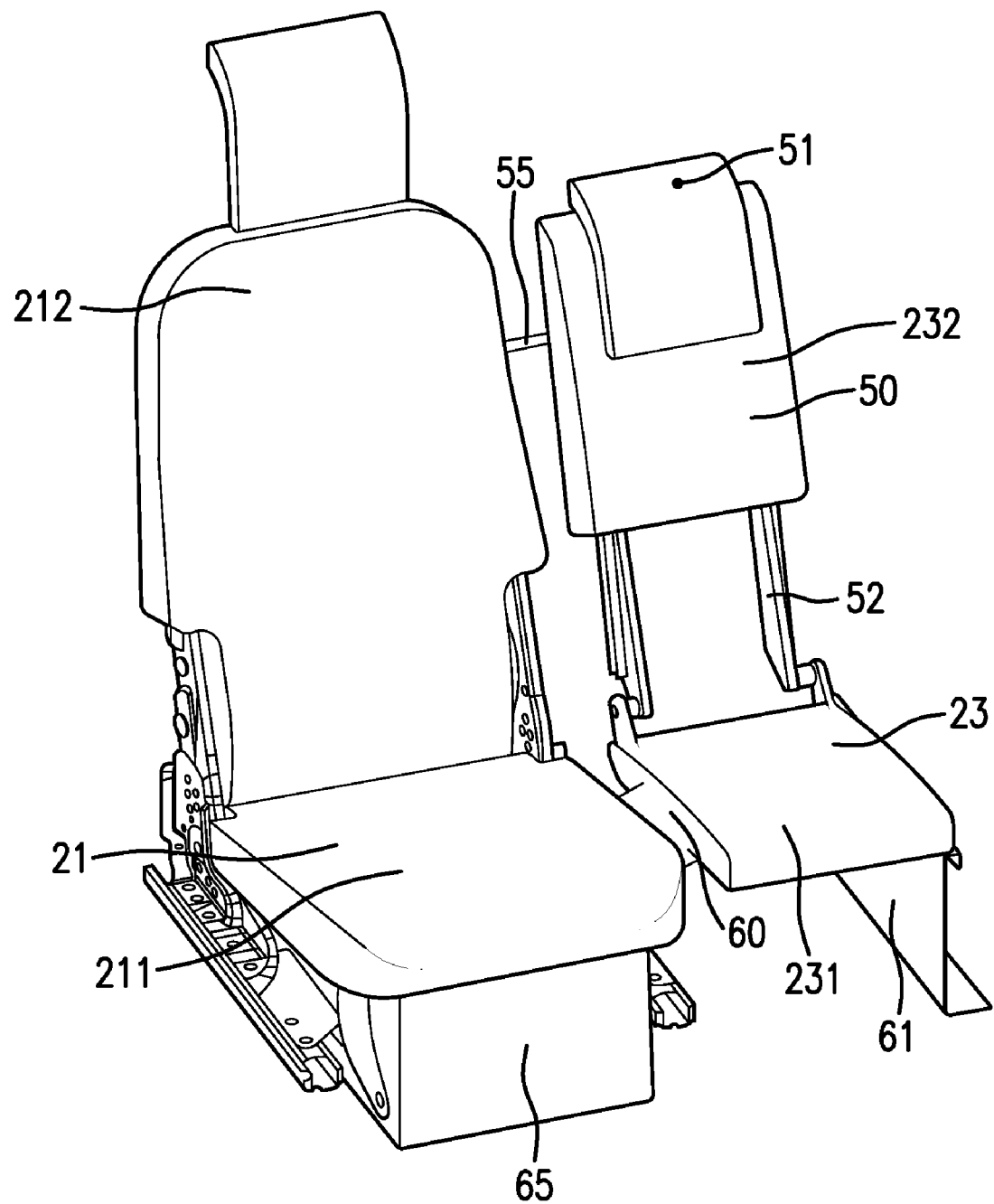
FIG. 3 is a perspective view of the vehicle seat system illustrated in FIG. 2 in another state.
Figure 4:
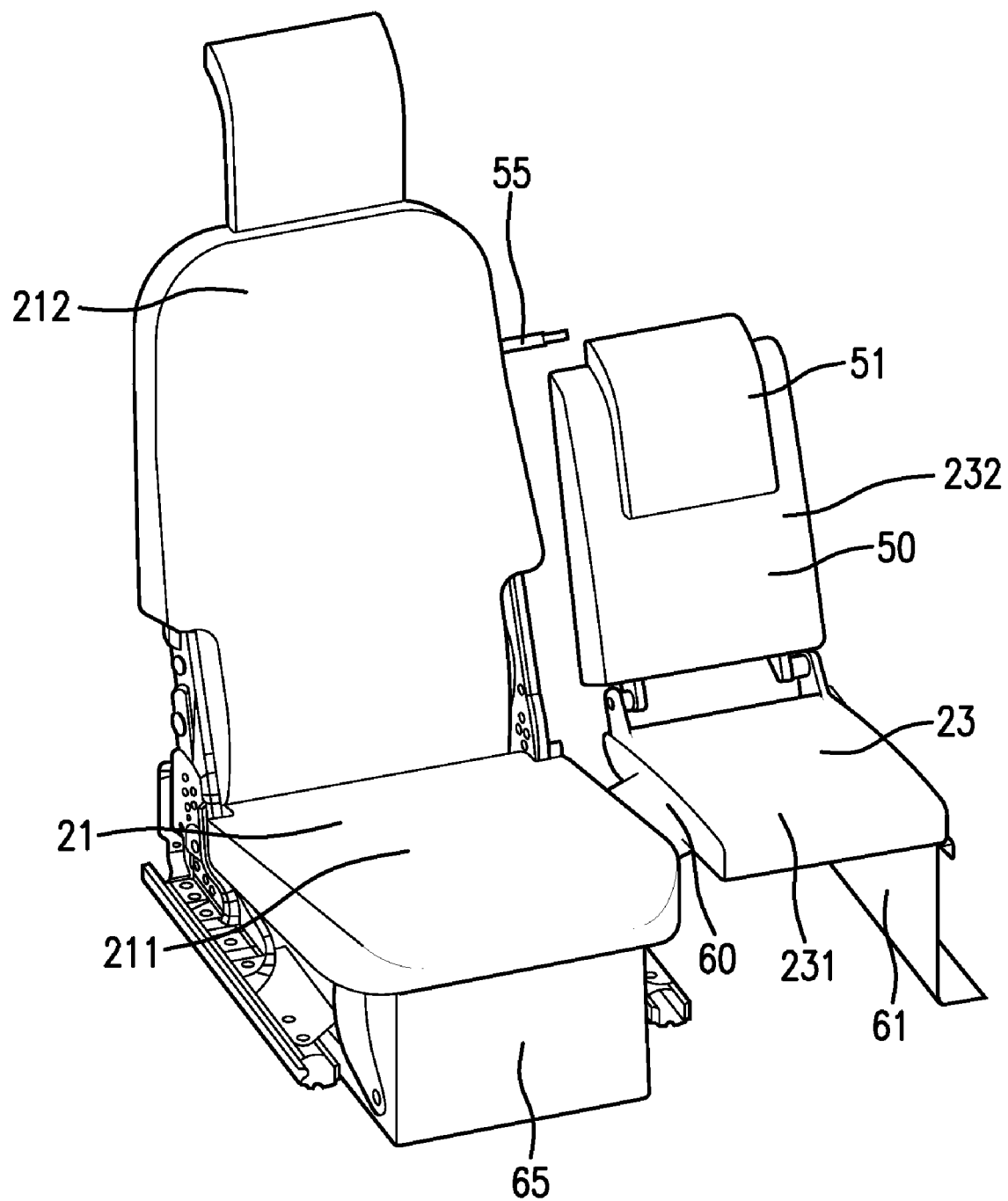
FIG. 4 is a perspective view of the vehicle seat system illustrated in FIG. 2 in another state.
Figure 10:
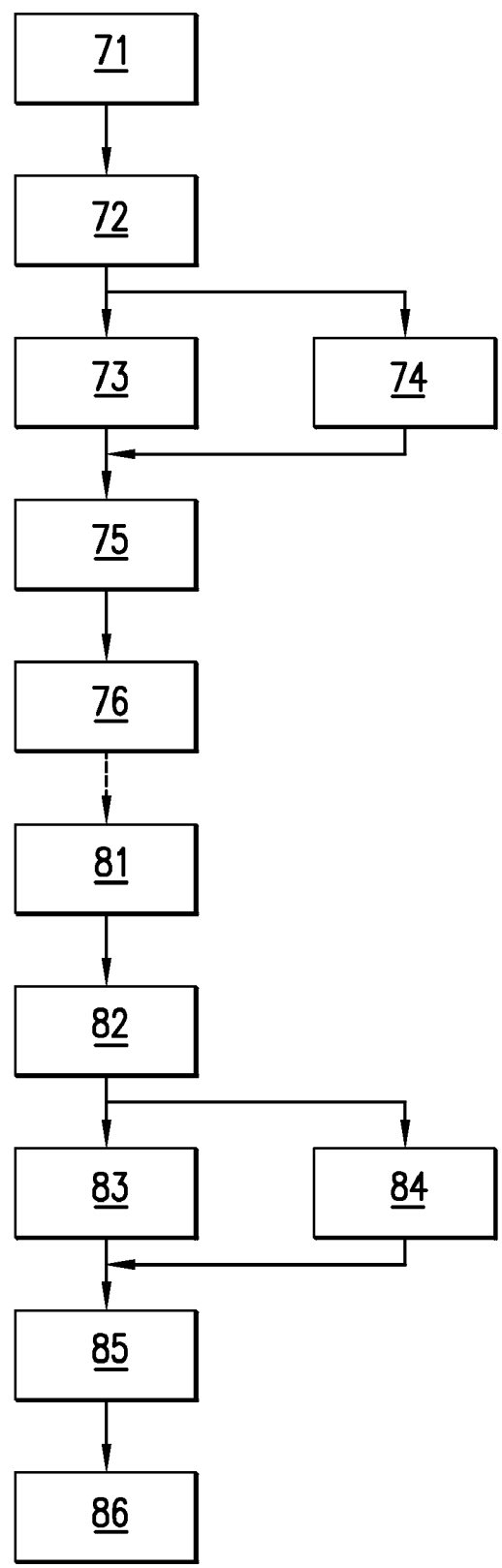
FIG. 10 is a flowchart illustrating a method for operating the vehicle seat system illustrated in FIG. 2 or the motor vehicle illustrated in FIG. 1.

FIG. 10 shows a method described with reference to FIGS. 3 to 8 for operating vehicle seat system 20. For this purpose, in a step 71, height-adjustable head rest 51 is slid against upholstered part 50, as illustrated in FIG. 3. In addition, lock 55 is released. This is followed by a step 72, in which the height of folding vehicle seat seat back 232 is reduced by sliding together folding vehicle seat seat back 232, as illustrated in FIG. 4. For the purpose of developing a child seat, there may be a provision for locking folding vehicle seat seat back 232 in this position as well, for example on seat back 212, and for folding vehicle seat 23 to be equipped with a safety belt suitable for children. In this connection, for example, there may be a provision for lock 55 to be situated so low that it is possible to lock folding vehicle seat seat back 232 in the state illustrated in FIG. 4 using the lower lock 55.

Figure 5:
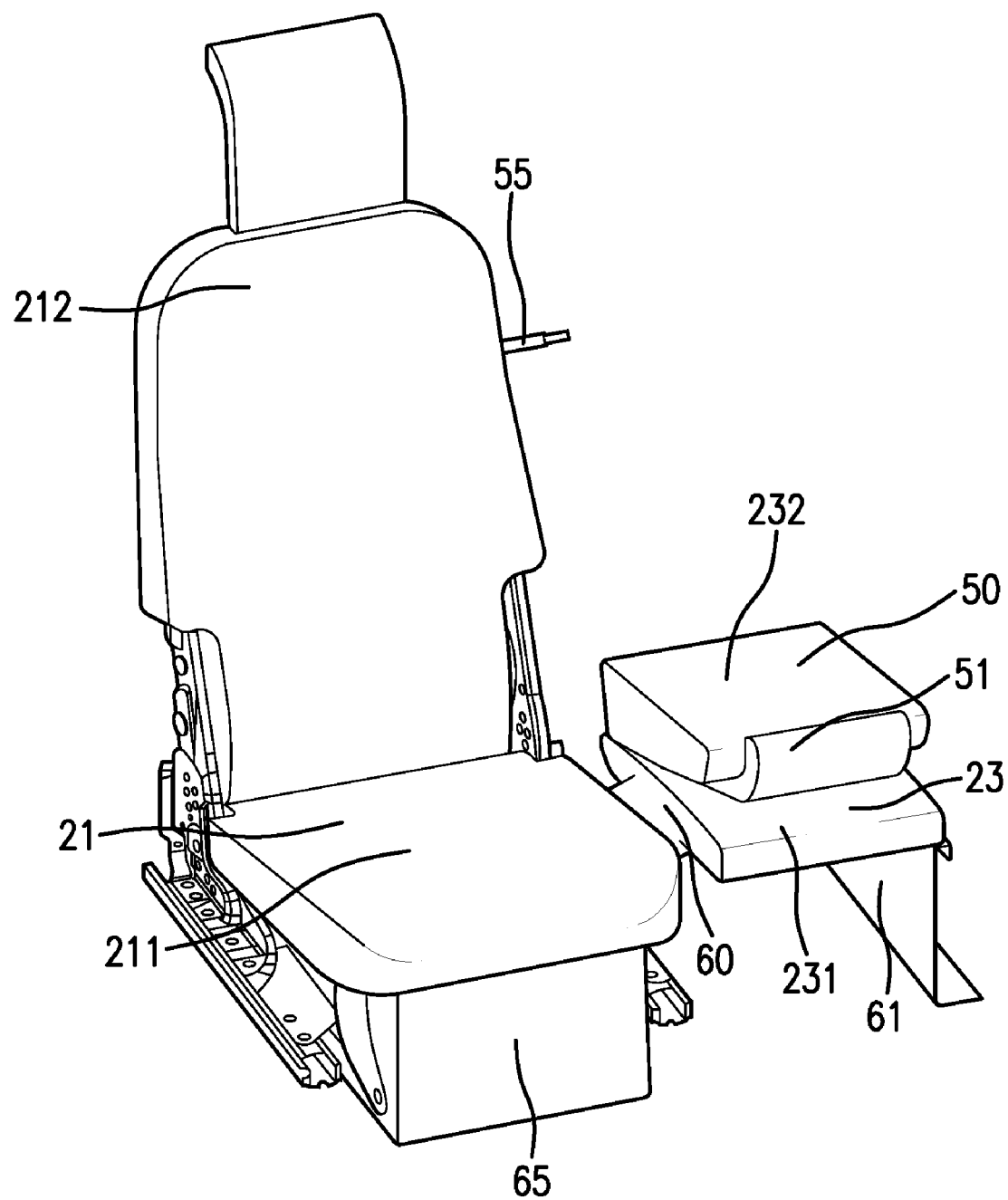
FIG. 5 is a perspective view of the vehicle seat system illustrated in FIG. 2 in another state.
Figure 6:
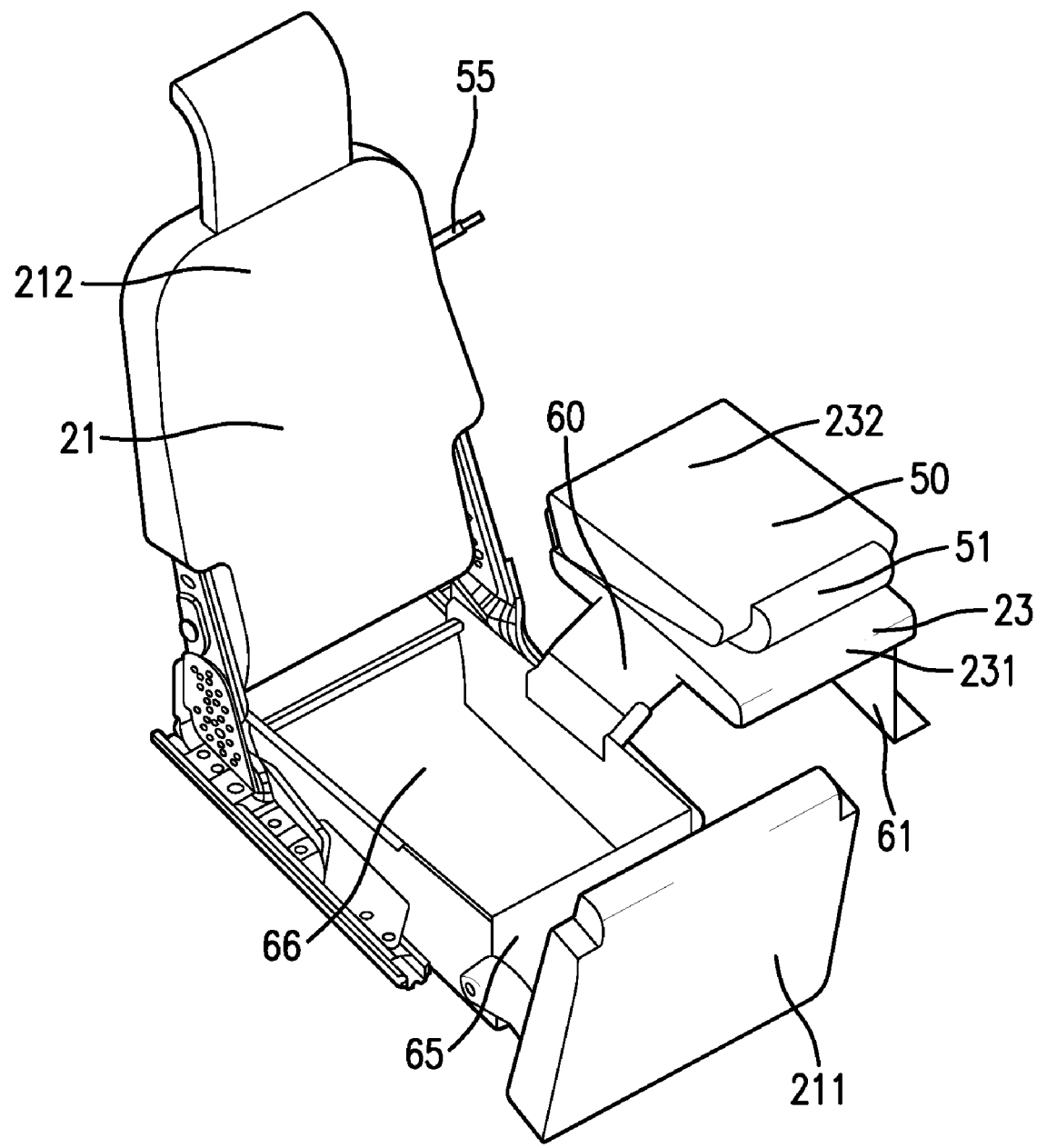
FIG. 6 is a perspective view of the vehicle seat system illustrated in FIG. 2 in another state.
Figure 7:
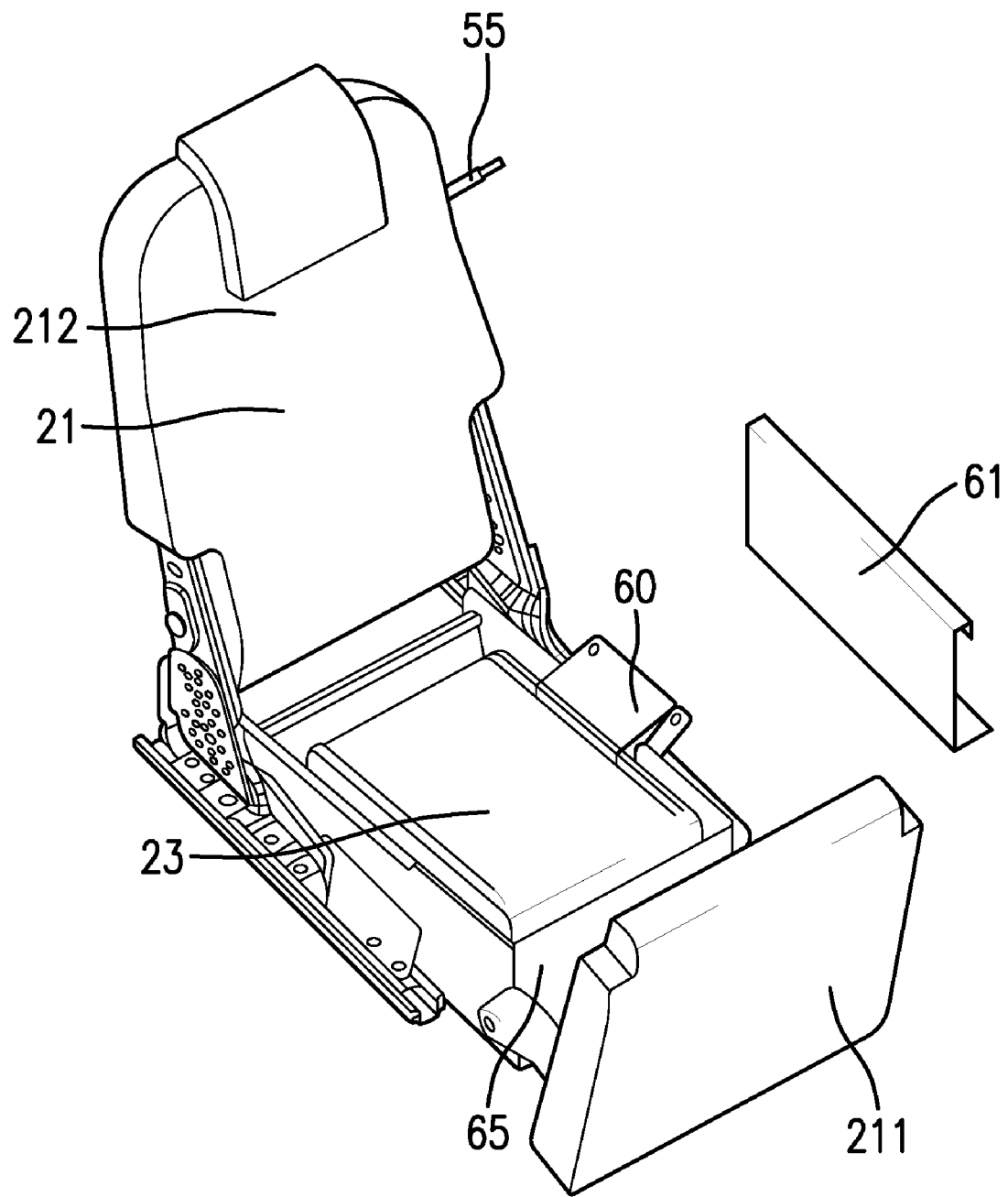
FIG. 7 is a perspective view of the vehicle seat system illustrated in FIG. 2 in another state.
Figure 8:
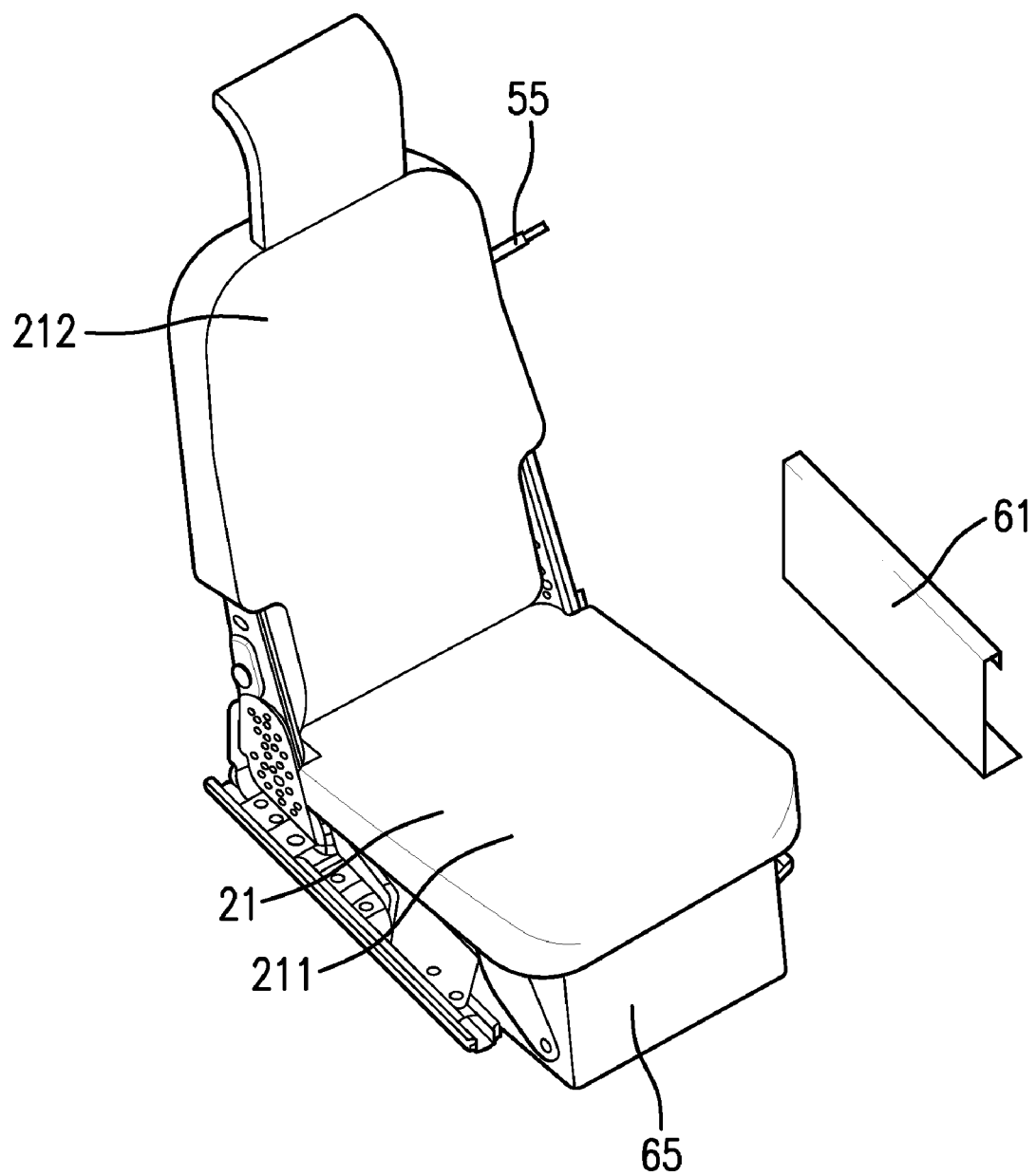
FIG. 8 is a perspective view of the vehicle seat system illustrated in FIG. 2 in another state.
Figure 9:
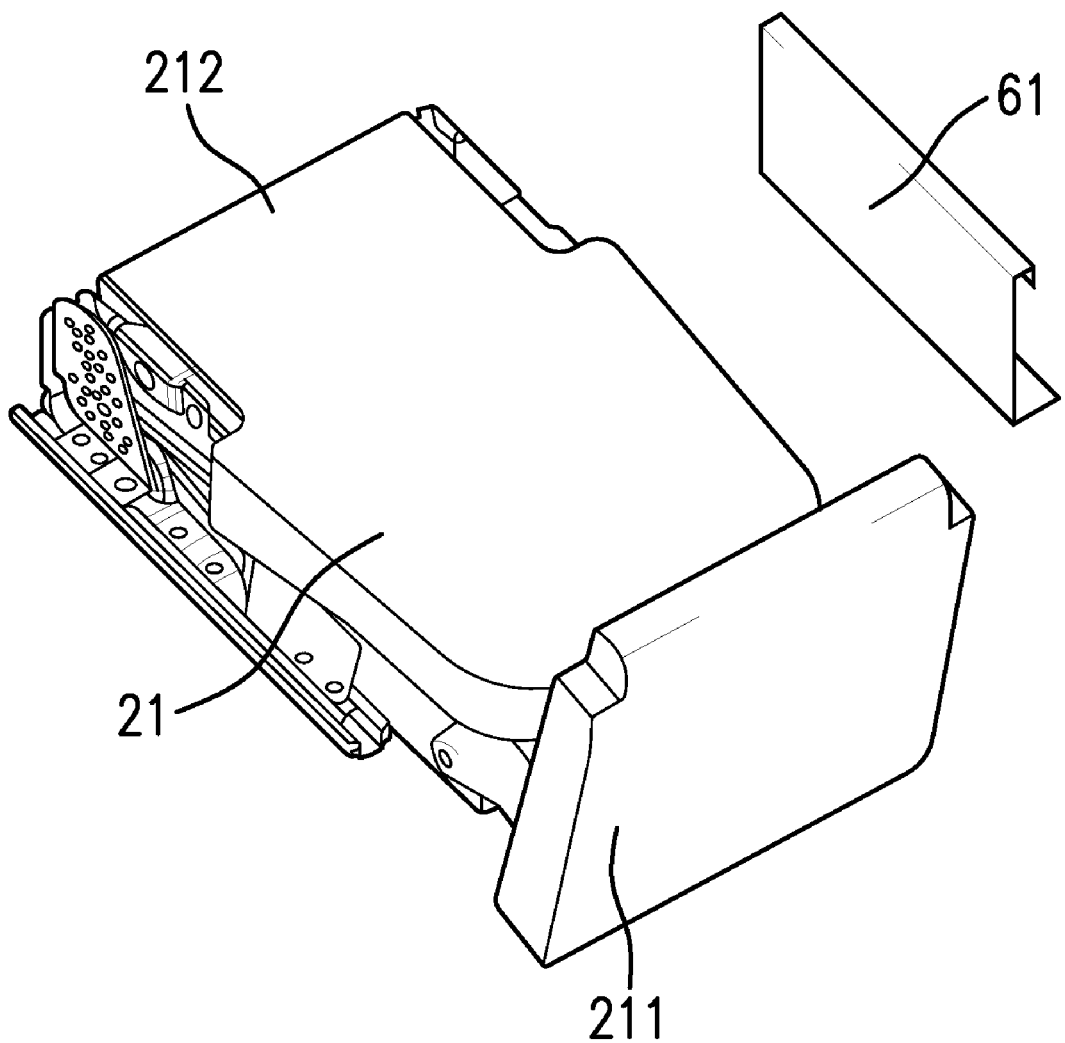
FIG. 9 is a perspective view of the vehicle seat system illustrated in FIG. 2 in another state.

Step 72 is followed by a step 73, in which folding vehicle seat 23 is folded up, as illustrated in FIG. 5, and by a step 74, in which seat part 211 is folded away or displaced for clearing an access 66 to storage space 65, as illustrated in FIG. 6. This is followed by a step 75, in which folding vehicle seat 23, as illustrated in FIG. 7, in its entirety is lowered from above into storage space 65 and/or folded from above into storage space 65. Subsequently, seat part 211 is folded back for closing storage space 65 in a step 76, as illustrated in FIG. 8. In addition, lock 55 may be folded away or sunk into seat back 212. In the state illustrated in FIG. 8, the gap between vehicle seat 21 and vehicle seat 22 or the support section allows access to vehicle seats 31 and 33 of motor vehicle 1. As illustrated in FIG. 9, there may be a provision for seat back 212 to be folded over for enlarging a loading area starting from the state illustrated in FIG. 7.

To make folding vehicle seat 23 available—beginning from the state illustrated in FIG. 8—seat part 211 is folded away or displaced in a step 81 for clearing access 66 to storage space 65, as illustrated in FIG. 7. Subsequently, in a step 82, folding vehicle seat 23 is taken out of storage space 65 through access 66 or is folded out of storage space 65, as illustrated in FIG. 6.

Step 82 is followed by a step 84, in which seat part 211, as illustrated in FIG. 5, is folded back so as to close storage space 65, and by a step 83, in which folding vehicle seat 23 is unfolded, as illustrated in FIG. 4. Subsequently, as illustrated in FIG. 3, upholstered part 50 is slid out in a step 85, and folding vehicle seat seat back 232 is locked on seat back 212 in a step 86. In addition, head rest 51 is positioned, as illustrated in FIG. 2.

Figure 11:
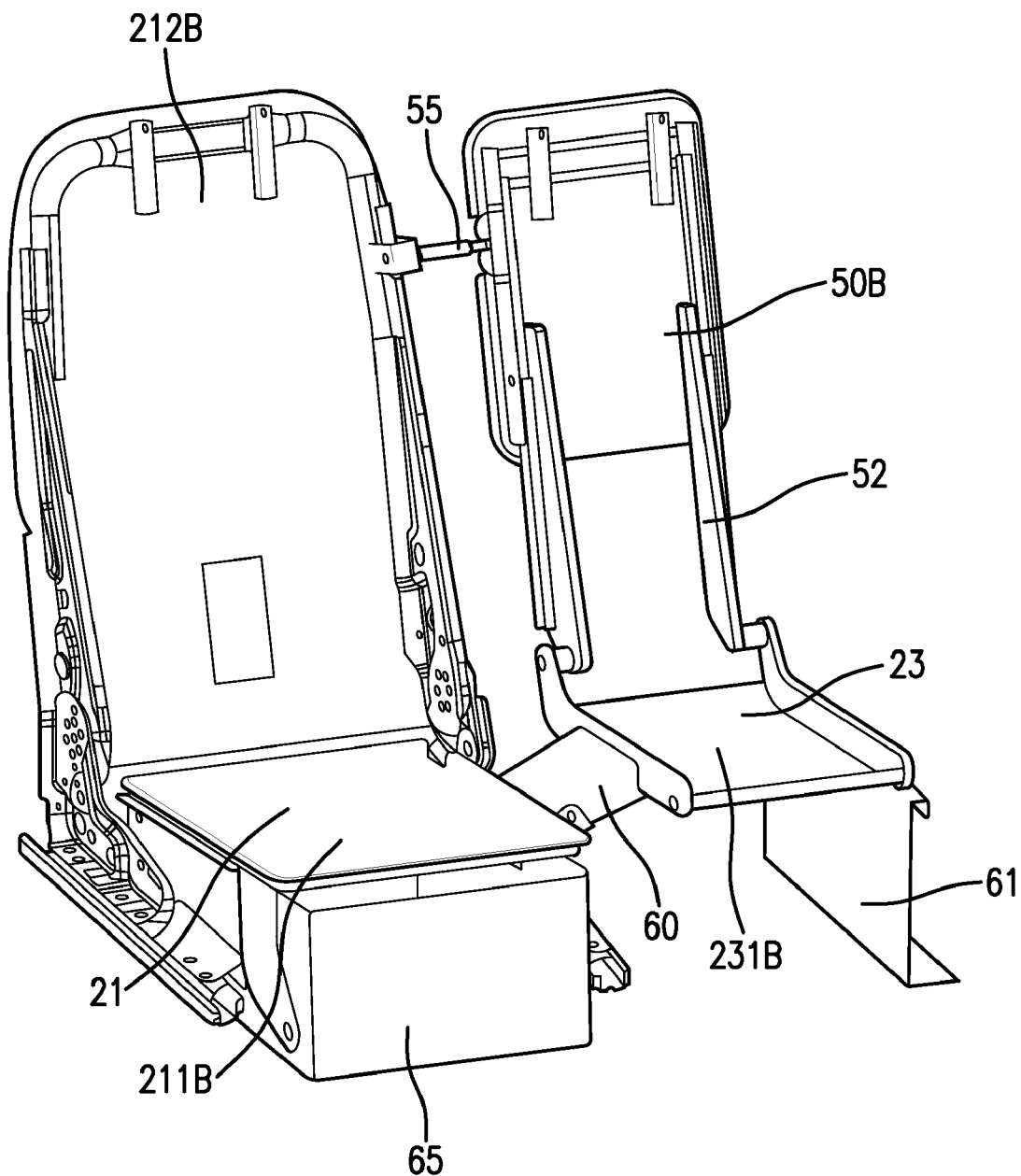
FIG. 11 is a perspective view of the vehicle seat system illustrated in FIG. 2 without upholstery.

FIG. 11 to FIG. 16 illustrate vehicle seat system 20 (without vehicle seat 22) without upholstery, FIG. 11 showing vehicle seat system 20 (without vehicle seat 22) in a perspective front view. In this instance, reference numeral 211B denotes a support sheet metal of seat part 211, reference numeral 212B denotes a back panel of seat back 212, reference numeral 231B denotes a support sheet metal of folding vehicle seat seat part 231, and reference numeral 50B denotes a support sheet metal of upholstered part 50.

Figure 12:
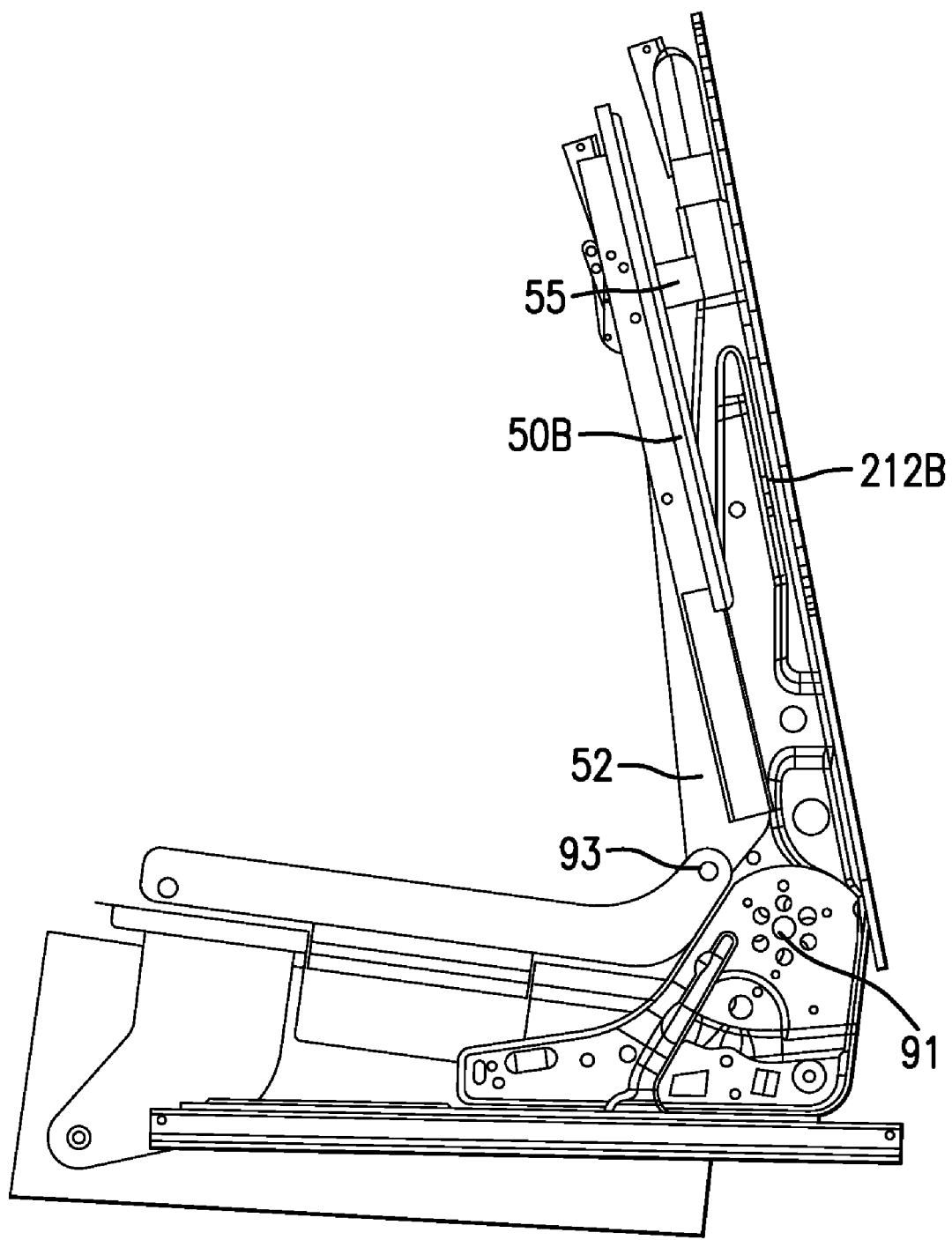
FIG. 12 is a side view of the vehicle seat system illustrated in FIG. 2 without upholstery.
Figure 13:
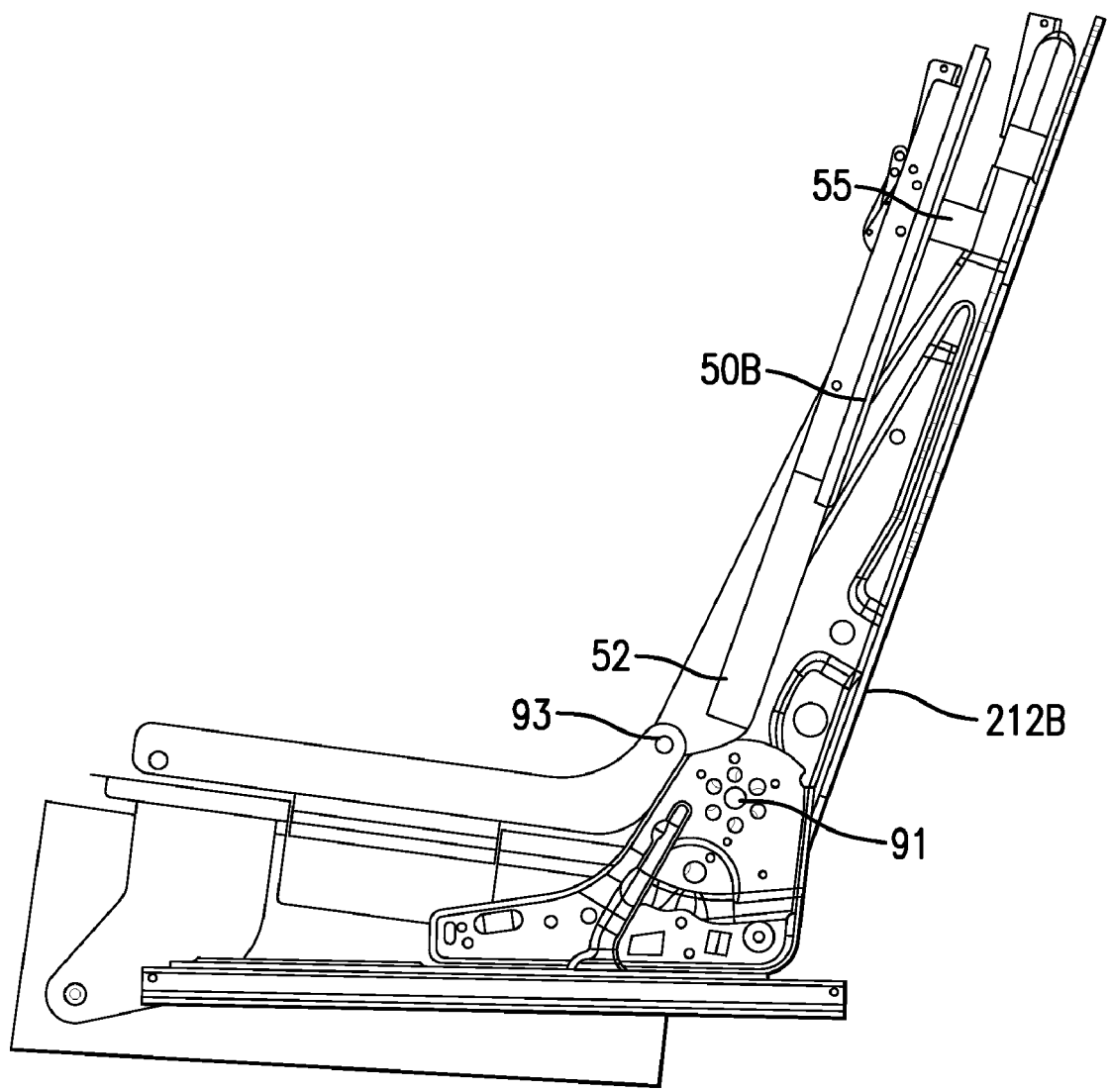
FIG. 13 is a side view of the vehicle seat system illustrated in FIG. 2 without upholstery.
Figure 14:
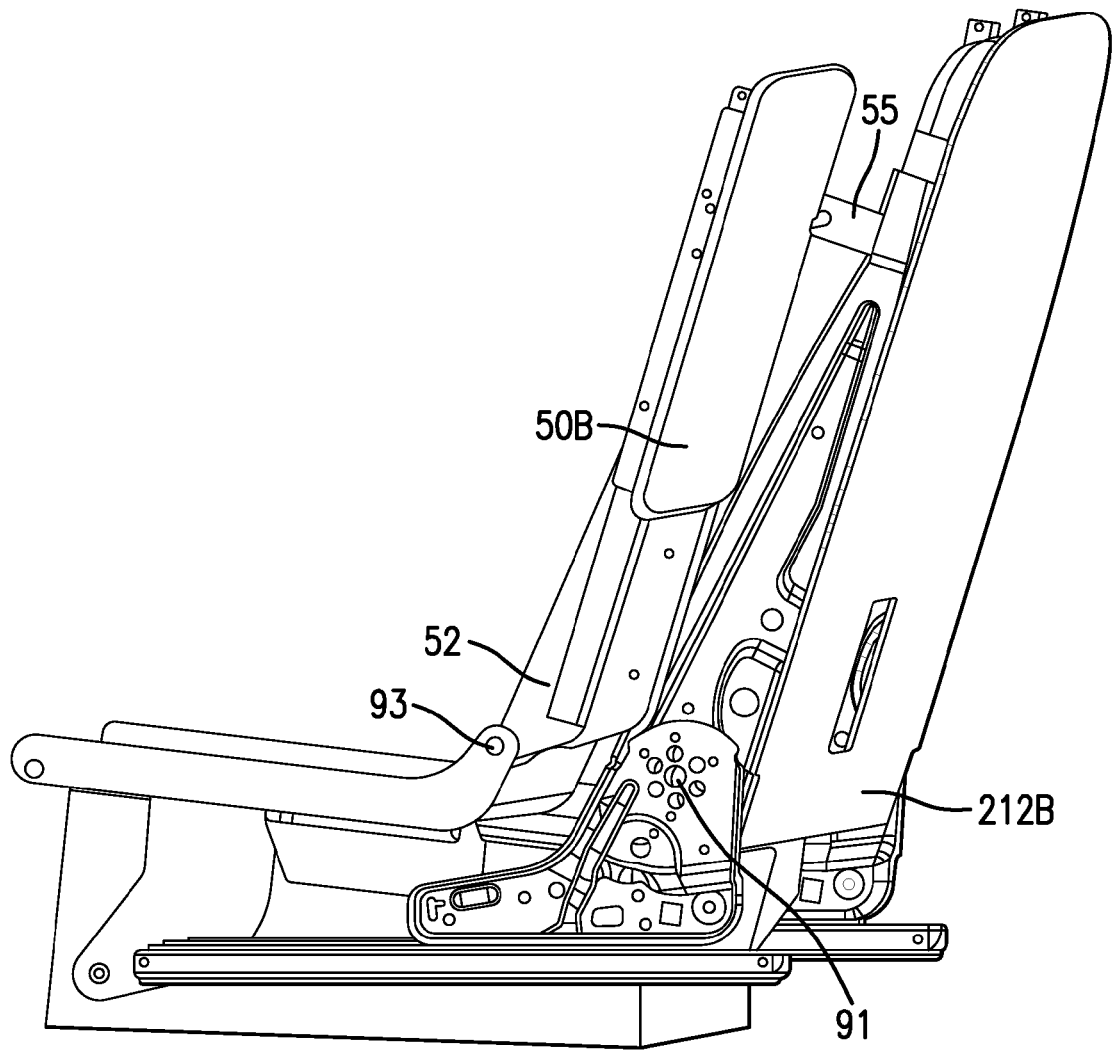
FIG. 14 is a perspective view of the vehicle seat system illustrated in FIG. 2 without upholstery.
Figure 15:
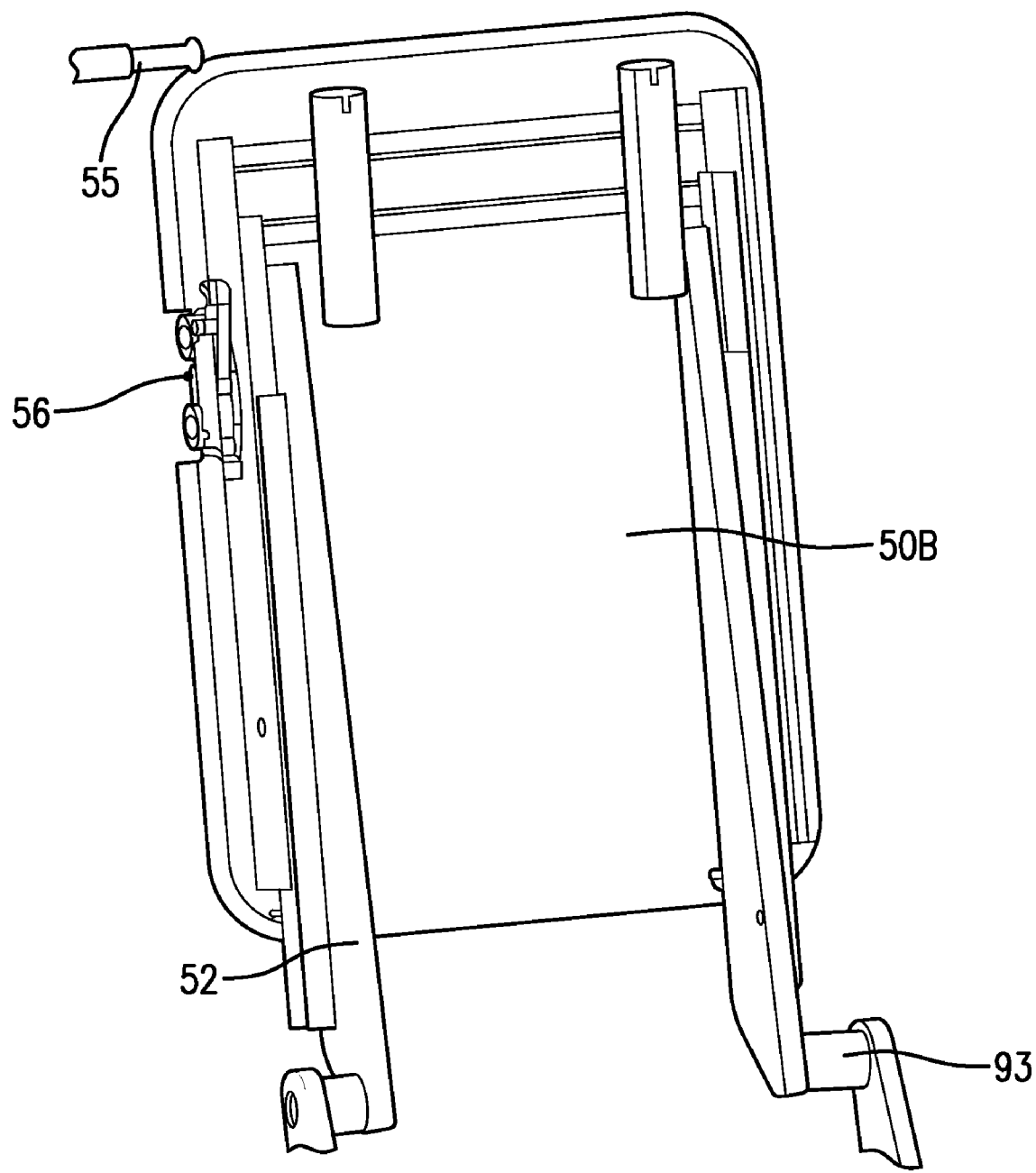
FIG. 15 illustrates a clamping mechanism for clamping a lock.
Figure 16:
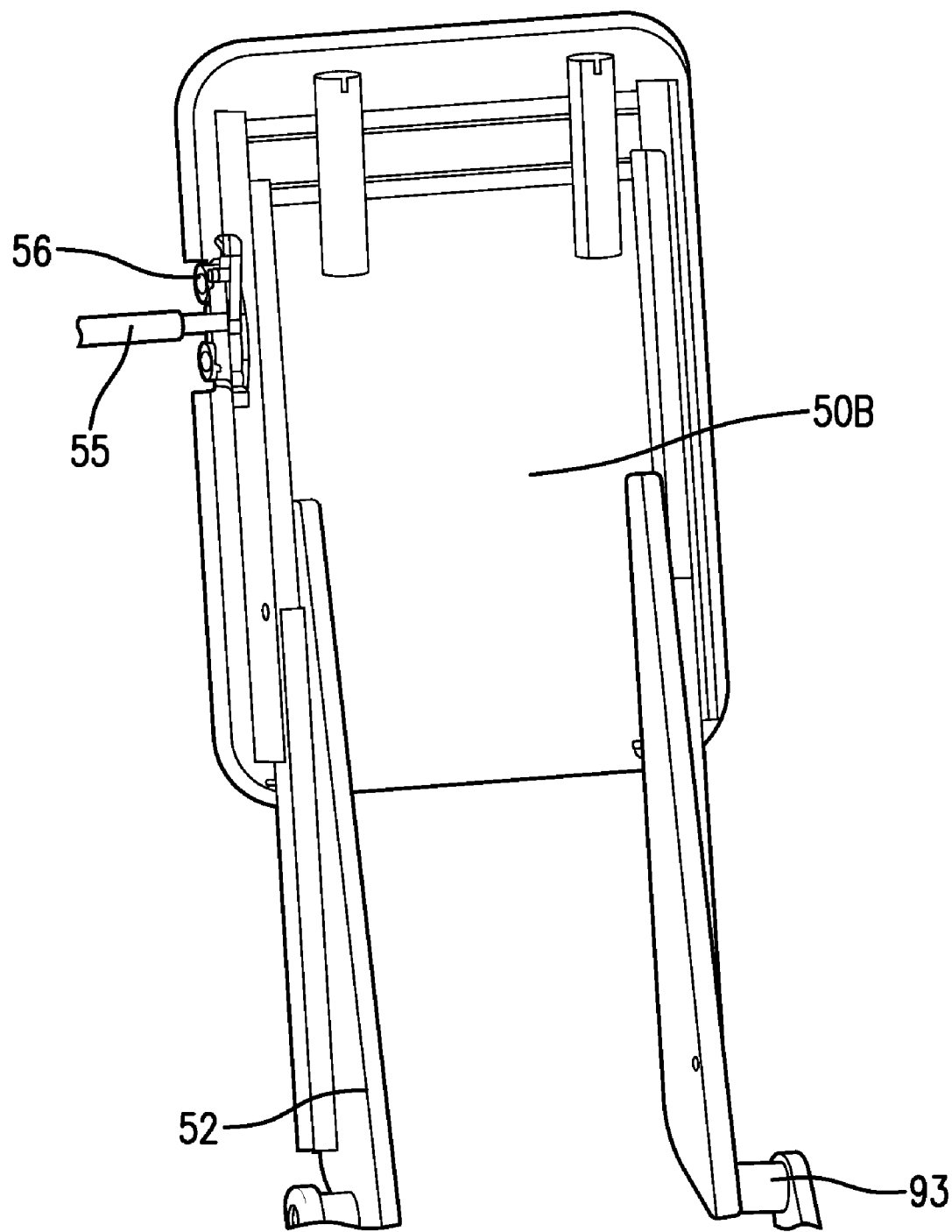
FIG. 16 illustrates the clamping mechanism illustrated in FIG. 15 having a clamped lock.

FIGS. 12 and 13 illustrate vehicle seat system 20 (without vehicle seat 22) in a lateral view, and FIG. 14 illustrates vehicle seat system 20 (without vehicle seat 22) in a perspective rear view. In this instance, reference numeral 91 denotes a hinge having an axis of rotation extending substantially in the transverse direction of motor vehicle 1 for mechanically connecting seat part 211 and seat back 212. Reference numeral 93 denotes a hinge having an axis of rotation extending substantially in the transverse direction of motor vehicle 1 for mechanically connecting folding vehicle seat seat part 231 and folding vehicle seat seat back 232, the axis of rotation of hinge 93 being offset or displaceable (forward) with respect to the axis of rotation of hinge 91 in the longitudinal direction of motor vehicle 1, e.g., by at least 50 mm. The axis of rotation of hinge 91 is an exemplary embodiment for a seat back axis of rotation. FIGS. 15 and 16 illustrate a clamping mechanism 56 for clamping lock 55 and thus for locking folding vehicle seat seat back 232 on seat back 231.

Figure 17:
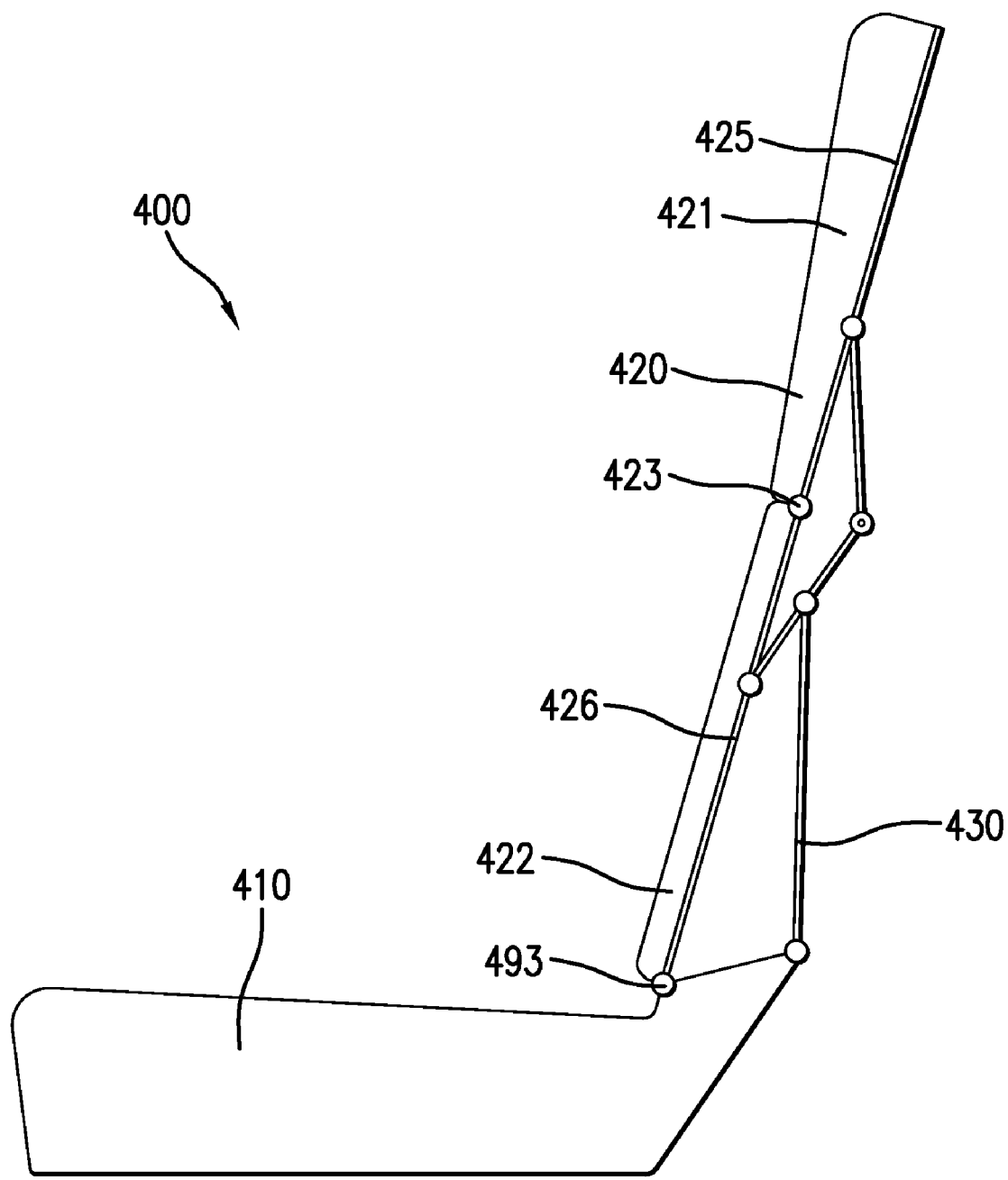
FIG. 17 is a side view of an unfolded folding vehicle seat having a bipartite seat back.
Figure 18:
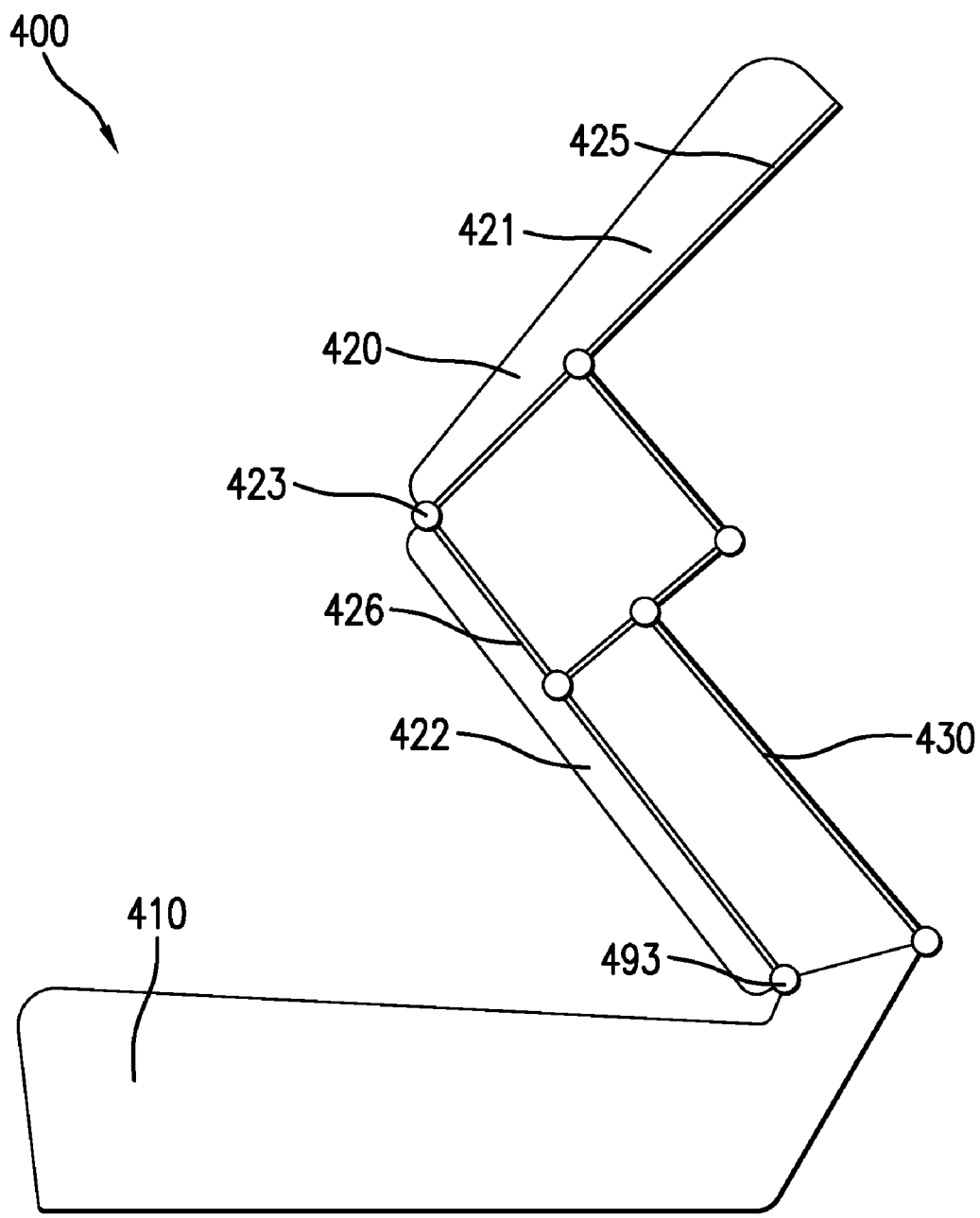
FIG. 18 is a side view of the folding vehicle seat illustrated in FIG. 17.
Figure 19:
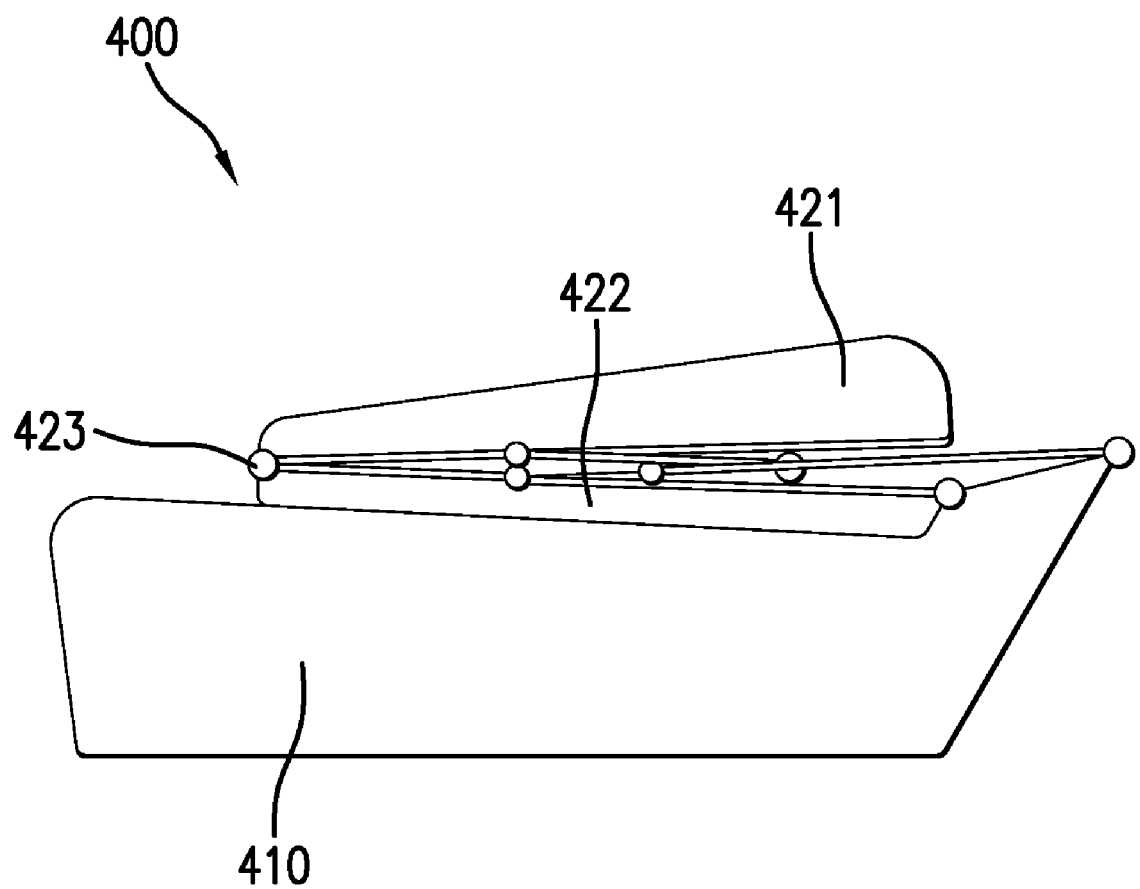
FIG. 19 is a side view of the folding vehicle seat illustrated in FIG. 17 in a folded state.

FIGS. 17 to 19 illustrate a folding vehicle seat 400 for an alternative use of folding vehicle seat 23, folding vehicle seat 400 being represented as unfolded in FIG. 17 and folded up in FIG. 19. Folding vehicle seat 400 includes a folding vehicle seat seat part 410 and a folding vehicle seat seat back 420, which is mechanically connected to folding vehicle seat seat part 410 by a hinge 493 having an axis of rotation extending substantially in the transverse direction of motor vehicle 1. Folding vehicle seat seat back 420 is foldable in itself and includes an upper seat back part 421 having a back panel 425, a lower seat back part 422 having a back panel 426 and a foldable support mechanism 430. Upper seat back part 421 is mechanically connected to lower seat back part 422 by a hinge 423 having an axis of rotation extending substantially in transverse direction of motor vehicle 1. Upper seat back part 421 and lower seat back part 422 are exemplary embodiments for parts of a folding vehicle seat seat back. Parts of a folding vehicle seat seat back include those that make a direct (e.g., by touch) contribution toward supporting an occupant.

The Figures are provided with simplicity and clarity in mind and not necessarily to an exact scale. Thus, for example, the orders of magnitude of some components are exaggerated as compared to other components in order to facilitate understanding thereof.

LIST OF REFERENCE NUMERALS 1 motor vehicle
10, 20, 30 Vehicle Seat System
11, 12, 21, 22, 31, 32 vehicle seat
13, 33 console
23, 400 folding vehicle seat
50 upholstered part
50B support sheet metal for an upholstered part
51 head rest
52 rail
55 lock
56 clamping mechanism
60, 91, 93, 423, 493 hinge
61 support section
65 storage space
66 access to a storage space
71, 72, 73, 74,
75, 76, 81, 82,
83, 84, 85, 86 step
111, 121, 211,
221, 311, 321 seat part
112, 122, 212,
222, 312, 322 seat back
211B support sheet metal for a seat part
212B, 425, 426 back panel
231, 410 folding vehicle seat seat part
231B support sheet metal for a folding vehicle seat seat part
232, 420 folding vehicle seat seat back
421 upper seat back part
422 lower seat back part
430 foldable support mechanism

What is claimed is:
1. A motor vehicle, comprising:
a vehicle seat system including:
a vehicle seat including a seat back and a seat part, the seat part and the seat back mechanically connected to each other by a hinge having a first axis of rotation extending substantially in a transverse direction of the motor vehicle; and
a folding vehicle seat foldable up and situated next to the vehicle seat, the folding vehicle seat including a folding vehicle seat seat part and a folding vehicle seat seat back, the folding vehicle seat seat part and the folding vehicle seat seat back mechanically con- nected to each other by a hinge having a second axis of rotation extending substantially in the transverse direction of the motor vehicle, the second axis of rotation displaceable in a longitudinal direction of the motor vehicle with respect to the first axis of rotation;

wherein the vehicle seat and the folding vehicle seat are mechanically connected to each other by a hinge having a third axis of rotation extending substantially in the longitudinal direction of the motor vehicle for folding the folding vehicle seat below the seat part when the second axis of rotation is displaced in the longitudinal direction of the motor vehicle with respect to the first axis of rotation.

2. The motor vehicle according to claim 1, wherein, in the folded state, the folding vehicle seat is situatable substantially entirely below the seat part.

3. The motor vehicle according to claim 1, wherein the second axis of rotation is displaceable by at least 50 mm in the longitudinal direction of the motor vehicle with respect to the first axis of rotation.

4. The motor vehicle according to claim 1, wherein the folding vehicle seat seat back is lockable on the seat back.

5. The motor vehicle according to claim 1, wherein the folding vehicle seat seat back is height-adjustable.

6. The motor vehicle according to claim 5, wherein the folding vehicle seat seat back is foldable up.

7. The motor vehicle according to claim 6, wherein the folding vehicle seat seat back includes an at least bipartite construction, at least two parts of the folding vehicle seat seat back being mechanically connected to each other by a hinge.

8. The motor vehicle according to claim 1, wherein a storage space accessible by at least one of (a) folding away and (b) displacing the seat part is provided below the seat part.

9. The motor vehicle according to claim 8, wherein the folding vehicle seat, in the folded state, when the seat part is at least one of (a) folded away and (b) displaced, is at least one of (a) lowerable from above into the storage space and (b) folded from above into the storage space.

10. The motor vehicle according to claim 8, wherein the folding vehicle seat, in the folded state, when the seat part is at least one of (a) folded away and (b) displaced, is, substantially entirely, at least one of (a) lowerable from above into the storage space and (b) folded from above into the storage space.

11. A vehicle seat system, comprising:
a vehicle seat including a seat back and a seat part, the seat back rotatable with respect to the seat part about a first axis of rotation; and
a folding vehicle seat foldable up and situated next to the vehicle seat, the folding vehicle seat including a folding vehicle seat seat part, the folding vehicle seat, in a folded state, situatable below the seat part;
wherein the folding vehicle seat includes a height-adjustable folding vehicle seat seat back that is rotatable with respect to the folding seat seat part about a second axis of rotation that is displaceable in a longitudinal direction of the vehicle with respect to the first axis of rotation, wherein the vehicle seat and the folding vehicle seat are mechanically connected to each other by a hinge having a third axis of rotation extending transversely to the first axis of rotation for folding the folding vehicle seat below the seat part when the second axis of rotation is displaced in the longitudinal direction of the vehicle with respect to the first axis of rotation.

12. The vehicle seat system according to claim 11, wherein the folding vehicle seat seat back is foldable up.

13. The vehicle seat system according to claim 12, wherein the folding vehicle seat seat back includes an at least bipartite construction, at least two parts of the folding vehicle seat seat back being mechanically connected to each other by a hinge.

14. The vehicle seat system according to claim 11, wherein the vehicle seat system is a vehicle seat system for a motor vehicle.

15. The vehicle seat system according to claim 11, wherein the folding vehicle seat, in the folded state, is substantially entirely situatable below the seat part.

16. The vehicle seat system according to claim 11, wherein the folding vehicle seat seat back is lockable on the seat back.

17. The vehicle seat system according to claim 11, wherein a storage space accessible by at least one of (a) folding away and (b) displacing the seat part is provided below the seat part.

18. The vehicle seat system according to claim 17, wherein the folding vehicle seat, in the folded state, when the seat part is at least one of (a) folded away and (b) displaced, is at least one of (a) lowerable from above into the storage space and (b) foldable from above into the storage space.

19. The vehicle seat system according to claim 17, wherein the folding vehicle seat, in the folded state, when the seat part is at least one of (a) folded away and (b) displaced, is, substantially entirely, at least one of (a) lowerable from above into the storage space and (b) foldable from above into the storage space.

20. A motor vehicle, comprising:
a vehicle seat system including:
a vehicle seat including a seat back and a seat part, the seat back rotatable with respect to the seat part about a first axis of rotation; and
a folding vehicle seat foldable up and situated next to the vehicle seat, the folding vehicle seat including a folding vehicle seat seat part, the folding vehicle seat, in a folded state, situatable below the seat part;
wherein the folding vehicle seat includes a height-adjustable folding vehicle seat seat back that is rotatable with respect to the folding seat seat part about a second axis of rotation that is displaceable in a longitudinal direction of the motor vehicle with respect to the first axis of rotation, wherein the vehicle seat and the folding vehicle seat are mechanically connected to each other by a hinge having a third axis of rotation extending transversely to the first axis of rotation for folding the folding vehicle seat below the seat part when the second axis of rotation is displaced in the longitudinal direction of the motor vehicle with respect to the first axis of rotation.

21. The motor vehicle according to claim 20, wherein the folding vehicle seat seat back includes an at least bipartite construction, at least two parts of the folding vehicle seat seat back being mechanically connected to each other by a hinge such that the first axis of rotation extends substantially in a transverse direction of the motor vehicle.

22. The motor vehicle according to claim 20, wherein the seat part and the seat back are mechanically connected to each other by a hinge that defines the first axis of rotation, the first axis of rotation extending substantially in a transverse direction of the motor vehicle.

23. The motor vehicle according to claim 22, wherein the second axis of rotation extends substantially in the transverse direction of the motor vehicle.

24. The motor vehicle according to claim 23, wherein the second axis of rotation is displaceable by at least 50 mm in the longitudinal direction of the motor vehicle with respect to the first axis of rotation.

* * * * *